(12) United States Patent
Honkanen et al.

(10) Patent No.: US 9,084,215 B2
(45) Date of Patent: Jul. 14, 2015

(54) TRANSMITTING POSITIONING INFORMATION VIA WIRELESS COMMUNICATION

(75) Inventors: Mauri Juhana Honkanen, Tampere (FI); Antti Paavo Tapani Kainulainen, Espoo (FI); Juha Johannes Salokannel, Tampere (FI); Jukka Pekka Reunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 261 days.

(21) Appl. No.: 13/081,761

(22) Filed: Apr. 7, 2011

(65) Prior Publication Data

US 2012/0257604 A1    Oct. 11, 2012

(51) Int. Cl.
  *H04W 64/00*     (2009.01)
  *H04W 4/02*      (2009.01)
  *H04W 8/00*      (2009.01)
  *H04W 76/02*     (2009.01)

(52) U.S. Cl.
  CPC .............. *H04W 64/00* (2013.01); *H04W 4/023* (2013.01); *H04W 4/025* (2013.01); *H04W 8/005* (2013.01); *H04W 76/023* (2013.01)

(58) Field of Classification Search
  USPC ................................ 370/338; 455/456.1, 560
  See application file for complete search history.

(56) References Cited

U.S. PATENT DOCUMENTS

| | | |
|---|---|---|
| 6,380,888 B1 | 4/2002 | Kucik |
| 6,975,618 B1 | 12/2005 | Smith et al. |
| 6,987,975 B1 | 1/2006 | Irvin et al. |
| 7,181,230 B2 | 2/2007 | Nonoyama et al. |
| 7,512,685 B2 | 3/2009 | Lunsford et al. |
| 7,606,578 B2 | 10/2009 | Irvin et al. |

(Continued)

FOREIGN PATENT DOCUMENTS

| | | |
|---|---|---|
| CN | 201131037 Y | 10/2008 |
| EP | 1416703 | 5/2004 |

(Continued)

OTHER PUBLICATIONS

Bluetooth Specification Version 4.0, vols. 0-6, Jun. 30, 2010, pp. 1-2302.

(Continued)

*Primary Examiner* — Michael Thier
*Assistant Examiner* — Yaotang Wang
(74) *Attorney, Agent, or Firm* — Locke Lord LLP

(57) ABSTRACT

A system for providing positioning information within a wireless communication signal. An example process may start by positioning resources being activated in an apparatus. Activation of the positioning resources may occur automatically, in response to user interaction, etc. The apparatus may then engage in a discovery process via wireless communication in order to identify other apparatuses within communication range that are enabled to transmit positioning information. Upon discovering another apparatus, the apparatus may interact with the other apparatus in order to determine a location for the other apparatus. For example, the apparatus may transmit one or more messages comprising a request for positioning information from the other apparatus, and may in turn receive one or more messages from the other apparatus comprising positioning information. The apparatus may then utilize the positioning information to determine its position (e.g., relative to the other apparatus).

28 Claims, 13 Drawing Sheets

(56) References Cited

U.S. PATENT DOCUMENTS

| | | |
|---|---|---|
| 7,986,917 B2 | 7/2011 | Ahlgren et al. |
| 8,165,523 B2 | 4/2012 | Makela et al. |
| 8,249,035 B2 * | 8/2012 | Godavarti et al. ............ 370/338 |
| 2002/0175819 A1 | 11/2002 | Joo |
| 2003/0220114 A1 | 11/2003 | Langensteiner et al. |
| 2004/0142690 A1 | 7/2004 | Eom et al. |
| 2004/0162059 A1 | 8/2004 | Hiltunen et al. |
| 2005/0032531 A1 | 2/2005 | Gong et al. |
| 2005/0156712 A1 | 7/2005 | Jyrinki |
| 2005/0267677 A1 | 12/2005 | Poykko et al. |
| 2005/0289236 A1 | 12/2005 | Hull et al. |
| 2006/0019679 A1 | 1/2006 | Rappaport et al. |
| 2007/0042710 A1 | 2/2007 | Mahini et al. |
| 2007/0099679 A1 | 5/2007 | Saarisalo |
| 2007/0123273 A1 * | 5/2007 | Vare et al. .................. 455/456.1 |
| 2007/0167171 A1 | 7/2007 | Bishop |
| 2007/0197229 A1 | 8/2007 | Kalliola et al. |
| 2008/0154501 A1 | 6/2008 | Meyer |
| 2008/0311957 A1 * | 12/2008 | Jantunen et al. ............. 455/560 |
| 2009/0221298 A1 * | 9/2009 | Hanner ...................... 455/456.1 |
| 2009/0305724 A1 * | 12/2009 | Lohi .......................... 455/456.1 |
| 2010/0081376 A1 | 4/2010 | Emura |
| 2010/0130233 A1 * | 5/2010 | Parker ........................ 455/456.3 |
| 2010/0250135 A1 | 9/2010 | Li et al. |
| 2010/0291952 A1 | 11/2010 | Gosset et al. |
| 2010/0302102 A1 | 12/2010 | Desai et al. |
| 2010/0309049 A1 | 12/2010 | Reunamaki et al. |
| 2010/0309051 A1 | 12/2010 | Moshfeghi |
| 2010/0317289 A1 | 12/2010 | Desai et al. |
| 2011/0110338 A1 * | 5/2011 | Khoryaev et al. ............ 370/335 |
| 2011/0201357 A1 | 8/2011 | Garrett et al. |
| 2012/0052802 A1 | 3/2012 | Kasslin et al. |
| 2012/0178471 A1 | 7/2012 | Kainulainen et al. |
| 2012/0238288 A1 | 9/2012 | Donaldson |

FOREIGN PATENT DOCUMENTS

| | | |
|---|---|---|
| EP | 1538791 | 6/2005 |
| EP | 1901086 | 3/2008 |
| WO | WO9810307 | 3/1998 |
| WO | WO0158098 | 8/2001 |
| WO | WO0201814 | 1/2002 |

OTHER PUBLICATIONS

Partial European Search Report mailed May 4, 2012 for European Application No. 11195136.4, 5 pages.

International Search Report of International Application No. PCT/FI2012/050254—Date of Completion of Search: Jun. 21, 2012—6 pages.

Written Opinion of the International Searching Authority of International Application No. PCT/FI2012/050254—Date of Completion of Opinion: Jun. 21, 2012—8 pages.

GPS NAVSTAR: "Global Positioning System Standard Positioning Service Signal Specification", 2nd Edition, Jun. 2, 1995, 52 pages.

Extended European Search Report and Opinion for European Application No. EP 11195869—Date of Completion of Search: Jan. 30, 2013, 10 pages.

English Language Machine Translation of Chinese Patent Application Publication No. CN201131037Y—5 pages.

Bluetooth Specification Version 4.0, vols. 0-6, Jun. 30, 2010, pp. 1-2301.

* cited by examiner

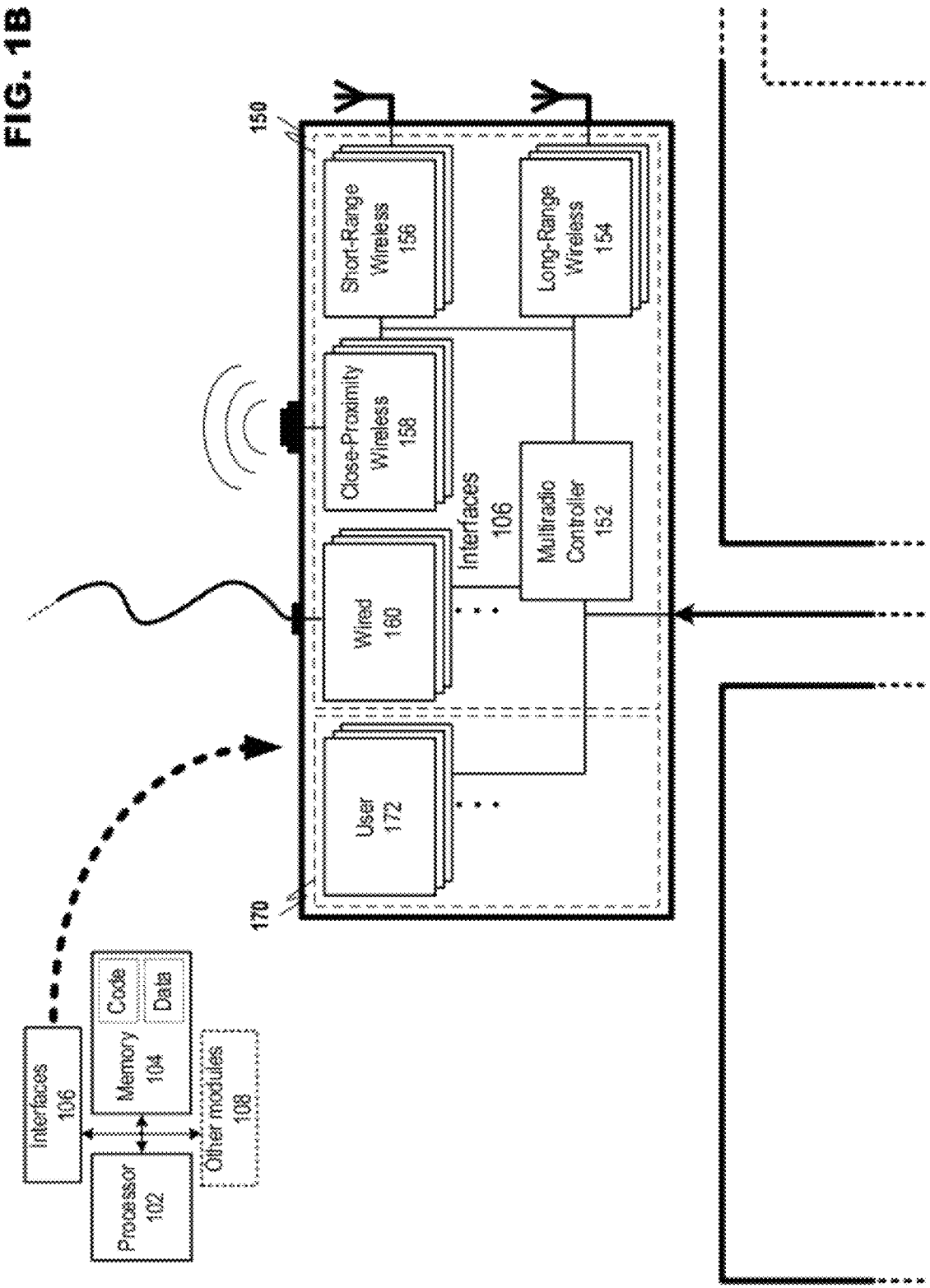

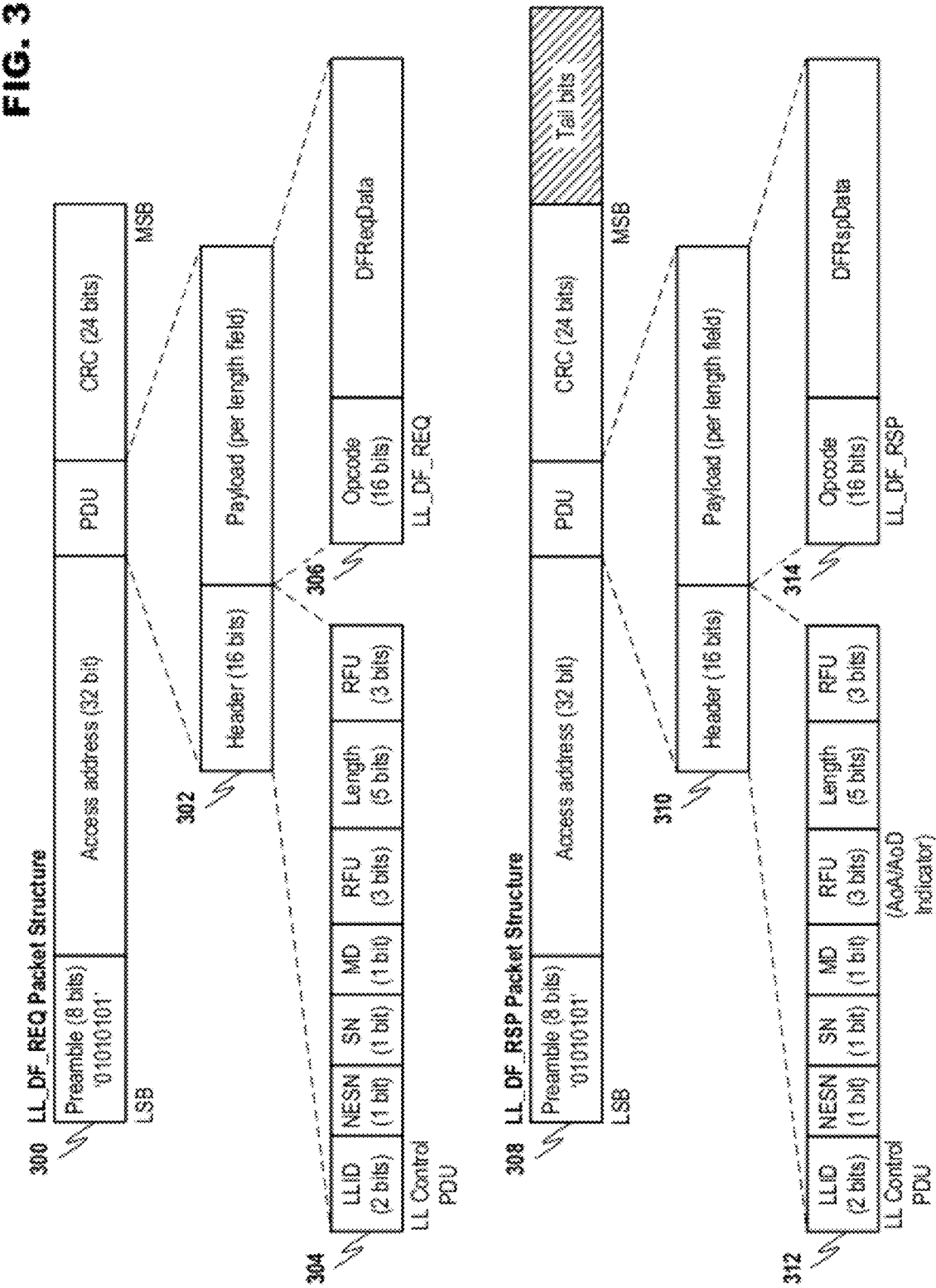

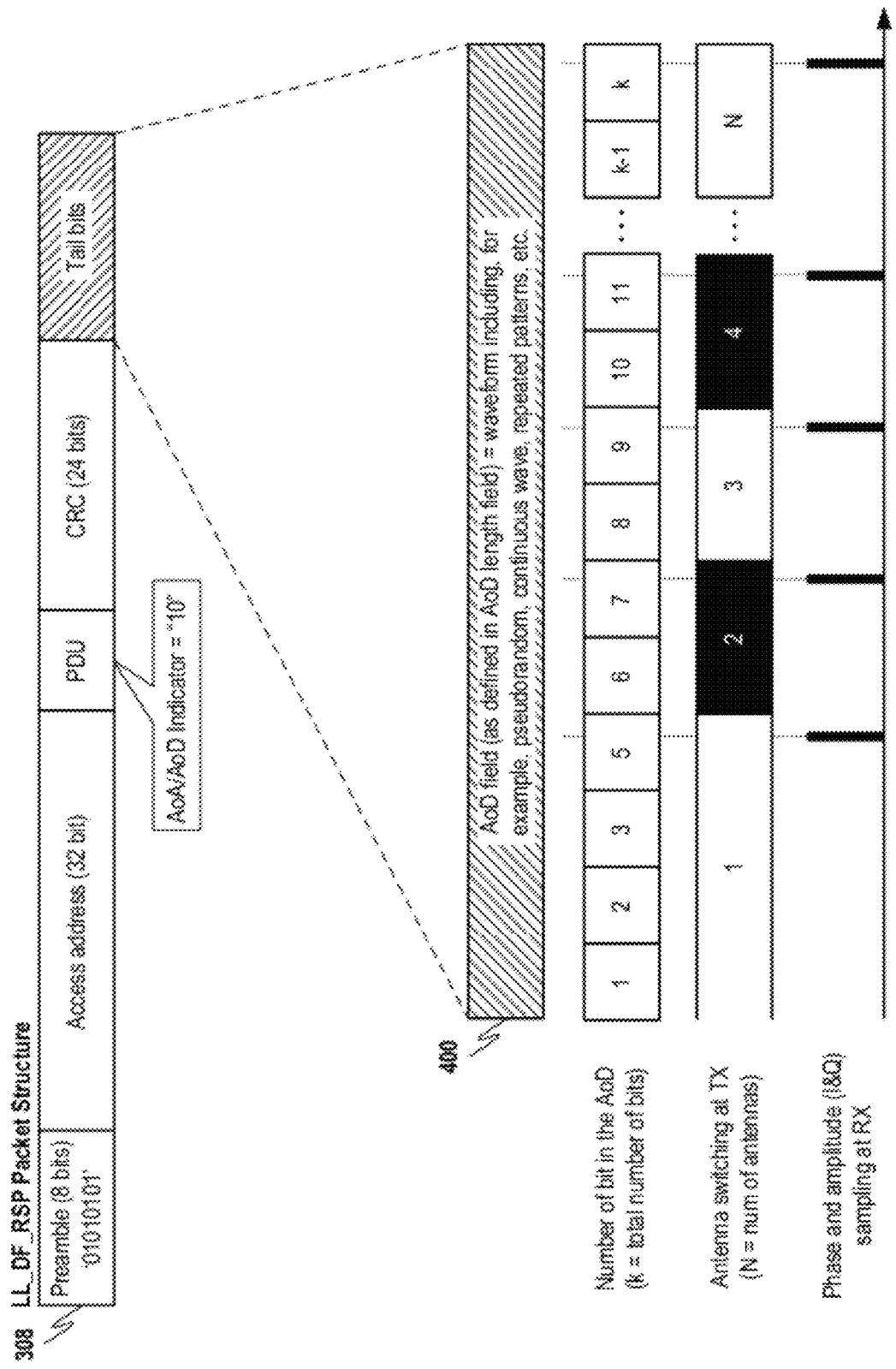

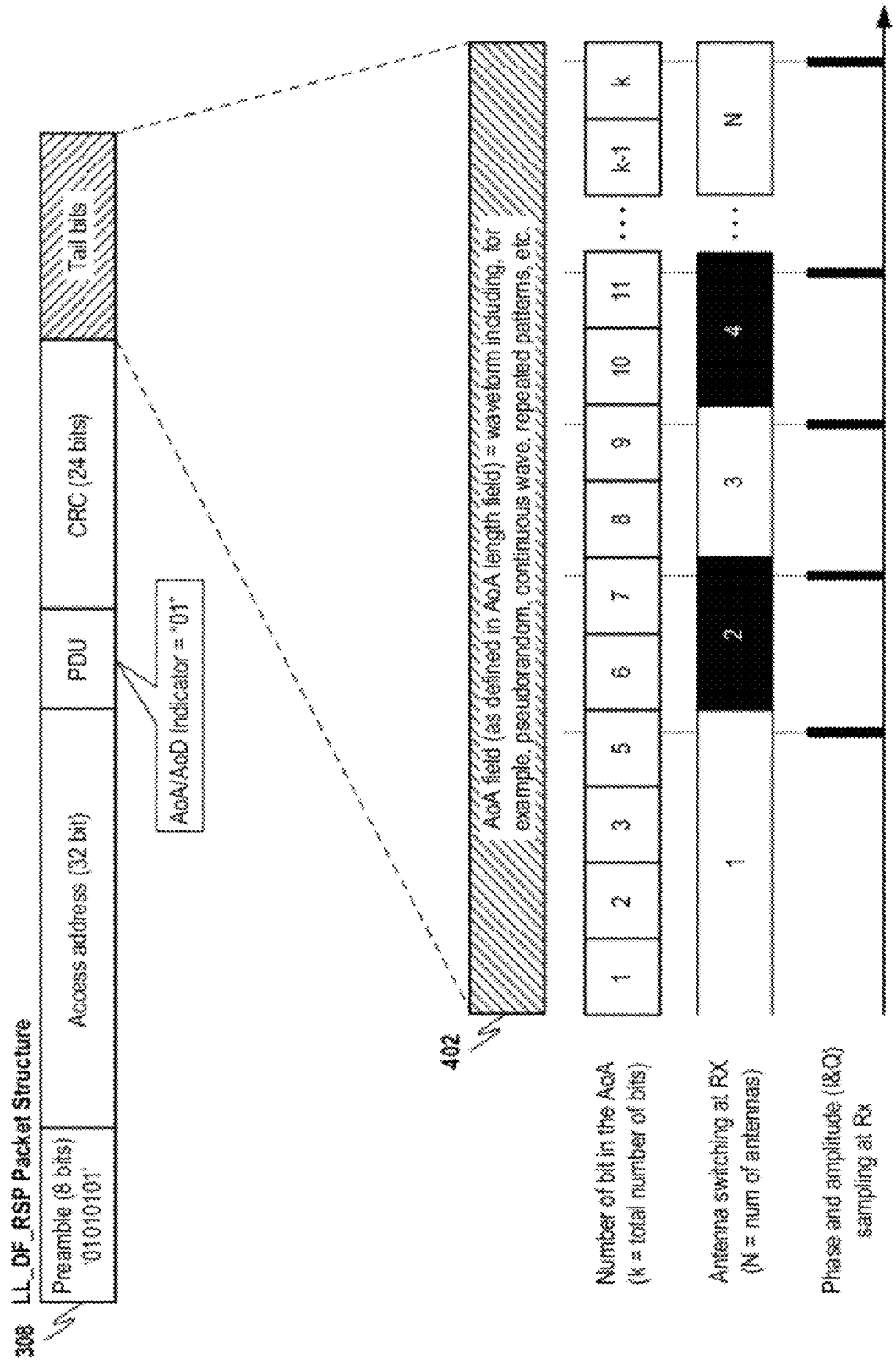

TRANSMITTING POSITIONING INFORMATION VIA WIRELESS COMMUNICATION

BACKGROUND

1. Field of Invention

The present invention relates to wireless communication, and in particular, to the provision of information usable for performing positioning operations in communication signals.

2. Background

The desire for apparatuses to serve in a multitude of roles is driving designers to incorporate more and more functionality into emerging devices. Wireless-enabled apparatuses are not only limited to the traditional conveyance of audio information, such as during telephonic operations, but may also convey video and other types of information for supporting a multitude of applications. For example, various applications may provide functionality on the surface that relies upon underlying wireless interaction for support. Obvious examples of such applications include programs that allow users to communicate directly with other users or resources, such as email, messaging services, Internet browsers, etc. There are also categories of applications that may provide services not directly related to user communication with other users or resources, but that still rely on underlying wireless exchange of information. Positioning-related services encompass a growing segment of applications that provide location services to users, such as mapping, route determination, tracking, etc., that rely upon wireless interaction for execution.

Positioning-related services may include known user-related applications, such as visual representations of locations or routes that may be displayed for users while underlying wireless communication is used to determine current apparatus position, direction, orientation, etc. However, other uses such as user/object tracking, location-specific social networking and commercial messaging, enhanced visual recognition, etc. are now becoming available that makes the ability to determine apparatus position a desirable feature to provide in mobile apparatuses. Positioning may be implemented using a variety of available technologies. For example, devices may incorporate global positioning system (GPS) receivers to receive signals from satellites for formulating an absolute (fixed) coordinate position. Terrestrial technologies (e.g., earth based cellular signals or short-range wireless interaction), while not as exact, may also be relied upon to resolve an absolute or relative (e.g., with respect to a signal source) apparatus position.

While incorporating positioning technologies in a variety of apparatuses may be possible, the implementation may not always be practical. Positioning operations may create a strain on apparatus resources as the rate at which position information needs to be updated may vary depending on the resolution needed, the rate of position change, etc. Apparatuses that have ample processing and energy resources may still rely upon controls that limit processing and energy consumption. It is therefore foreseeable that the implementation of positioning services in apparatuses that may have more limited resources will present a challenge to designers. For example, desired applications such as user/object tracking may utilize mobile battery-powered apparatuses as beacons, sensors, etc. These devices may have extremely limited processing and communication ability, may not possess adequate size for dedicate positioning hardware and/or software, may not have the power capacity to support dedicated positioning operations, etc.

SUMMARY

Various example embodiments of the present invention may be directed to a method, apparatus, computer program product and system for providing positioning information within a wireless communication signal. An example process may start by positioning resources being activated in an apparatus. Activation of the apparatus positioning resources may occur automatically, in response to user interaction, etc. The apparatus may then engage in a discovery process via wireless communication in order to identify other apparatuses within communication range that are enabled to transmit positioning information. Upon discovering another apparatus, the apparatus may interact with the other apparatus in order to determine a location for the other apparatus. For example, the apparatus may transmit one or more messages comprising a request for positioning information from the other apparatus, and may in turn receive one or more messages from the other apparatus comprising positioning information. The apparatus may then utilize the positioning information to determine its position (e.g., relative to the other apparatus).

In at least one example implementation, the discovery process may occur using a service discovery protocol associated with a wireless communication medium such as Bluetooth Low Energy (Bluetooth LE). During service discovery the apparatus may learning if the other apparatus supports direction finding services, and if so, whether the positioning information that is transmitted by the other apparatus is configurable. The apparatus may then, if the positioning information is determined to be configurable, transmit a preferred configuration in a positioning information configuration message and/or a positioning information request message to the other apparatus. The apparatus may then receive positioning information via wireless communication.

Positioning information may comprise a sequence of bits that may be, for example, appended to the end of a message, within the message (e.g., in a data field), etc. When it is determined that the positioning information is not configurable, the bit sequence may be predetermined. Otherwise, the bit sequence may be formatted in accordance with the positioning information configuration message. It may also be possible to configure the number of positioning information messages that are transmitted. For example, a request may be made to transmit a burst comprising multiple positioning information messages. After receiving the positioning information messages, the apparatus may utilize a direction finding methodology, such as Angle of Arrival (AoA) or Angle of Departure (AoD) estimation, to analyze the received positioning information to determine a relative direction towards the other apparatus.

In accordance with at least one embodiment of the present invention, an apparatus may also engage in a formal wireless connection with at least one other apparatus, for example, as a result of the apparatus advertising its presence over a wireless communication medium like Bluetooth LE. The apparatus may then transmit information about positioning services available from the apparatus to the at least one other apparatus, for example, during a service discovery protocol. If a positioning configuration message is received in the apparatus from the at least one other apparatus, the apparatus may then transmit a message responding to the positioning configuration message. If a positioning information request message is received in the apparatus from the at least one other apparatus, the apparatus may further transmit at least one message comprising positioning information.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 3 discloses example packet structures for requesting and providing positioning information in accordance with at least one embodiment of the present invention.

FIG. 4A discloses an example of AoD positioning information and the processing of positioning information in accordance with at least one embodiment of the present invention.

FIG. 4B discloses an example of AoA positioning information and the processing of positioning information in accordance with at least one embodiment of the present invention.

DESCRIPTION OF EXAMPLE EMBODIMENTS

Figure 1A:
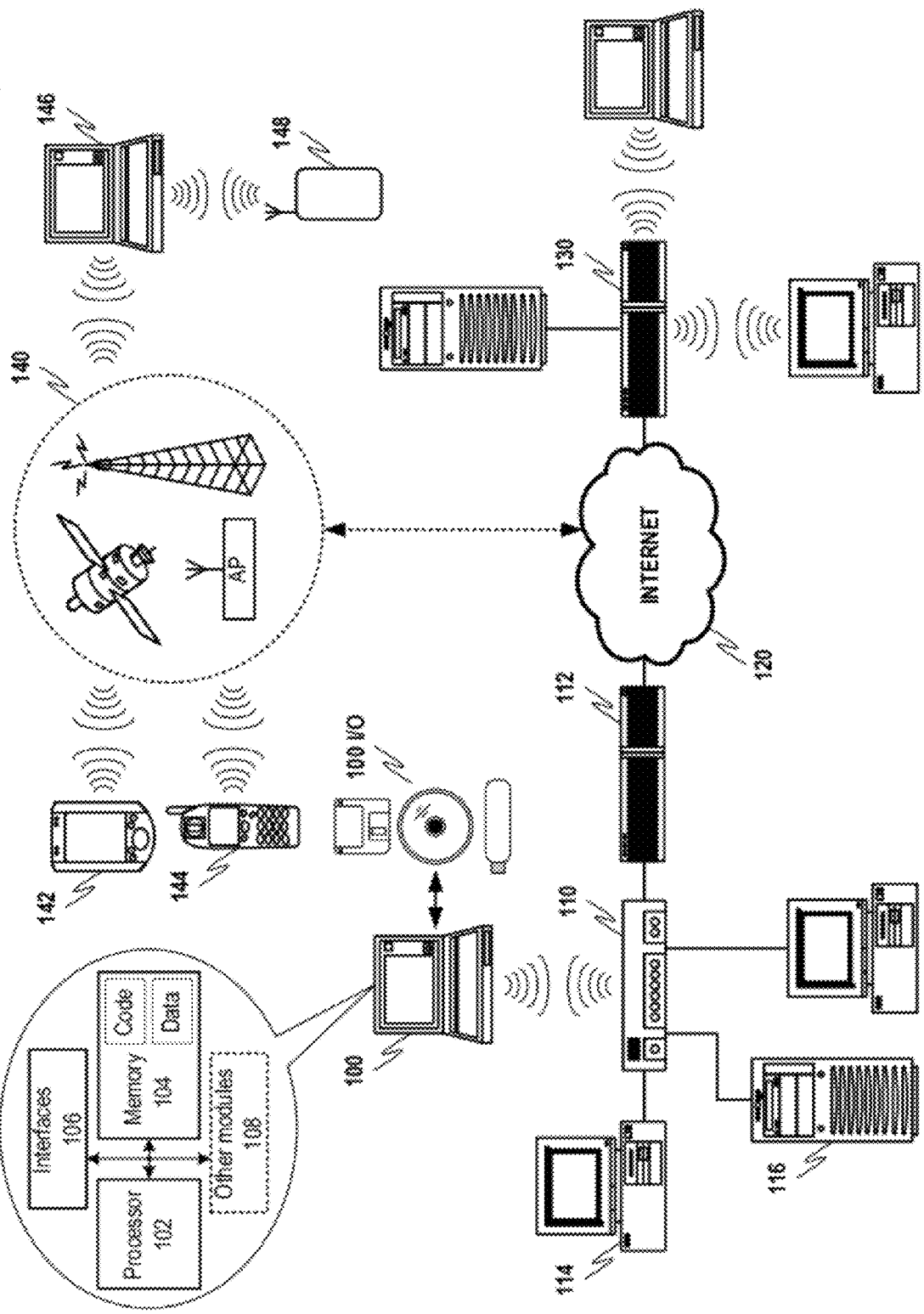
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Examples of Apparatus Positioning

Positioning in apparatuses may be supported, in whole or in part, through the use of combinations of hardware interfaces and/or software applications such as previously described with respect to FIG. 1A-1B. For example, Global Positioning System (GPS) receivers may be incorporated in apparatuses and may be integrated with the aforementioned apparatus resources for receiving signals that may be used to derive coordinates corresponding to apparatus location. However, the integration of a GPS receiver may not provide an ideal solution for all situations.

For example, a usage scenario may comprise a tag coupled to a car or house key (e.g., as a key chain or fob) that is intended to be traceable by a mobile device. Implementing a dedicated GPS receiver may require space for a receiver chipset along with processing/energy resources for operating the receiver, which may prove problematic in small items like a key tag. The key tag example also demonstrates that the space needed to implement positioning solutions may not be available in smaller apparatuses. Moreover, GPS signals may not be reliable, or even available in some situations (e.g., when tracking a key tag inside a structure like a building). As a result, other modes of positioning may need to be implemented.

Figure 2A:
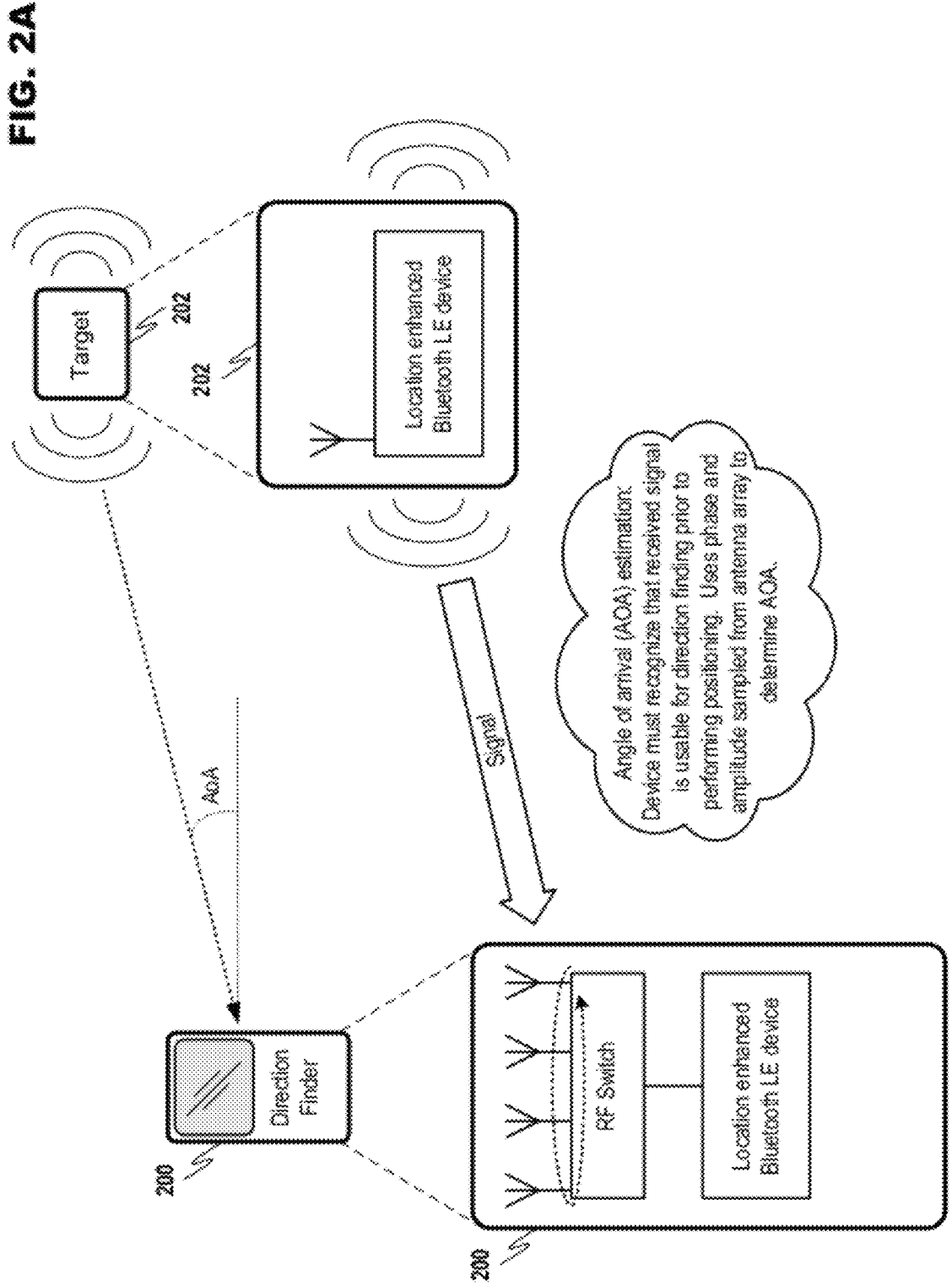
FIG. 2A discloses an example of angle-of-arrival (AoA) positioning in accordance with at least one embodiments of the present invention.
Figure 2B:
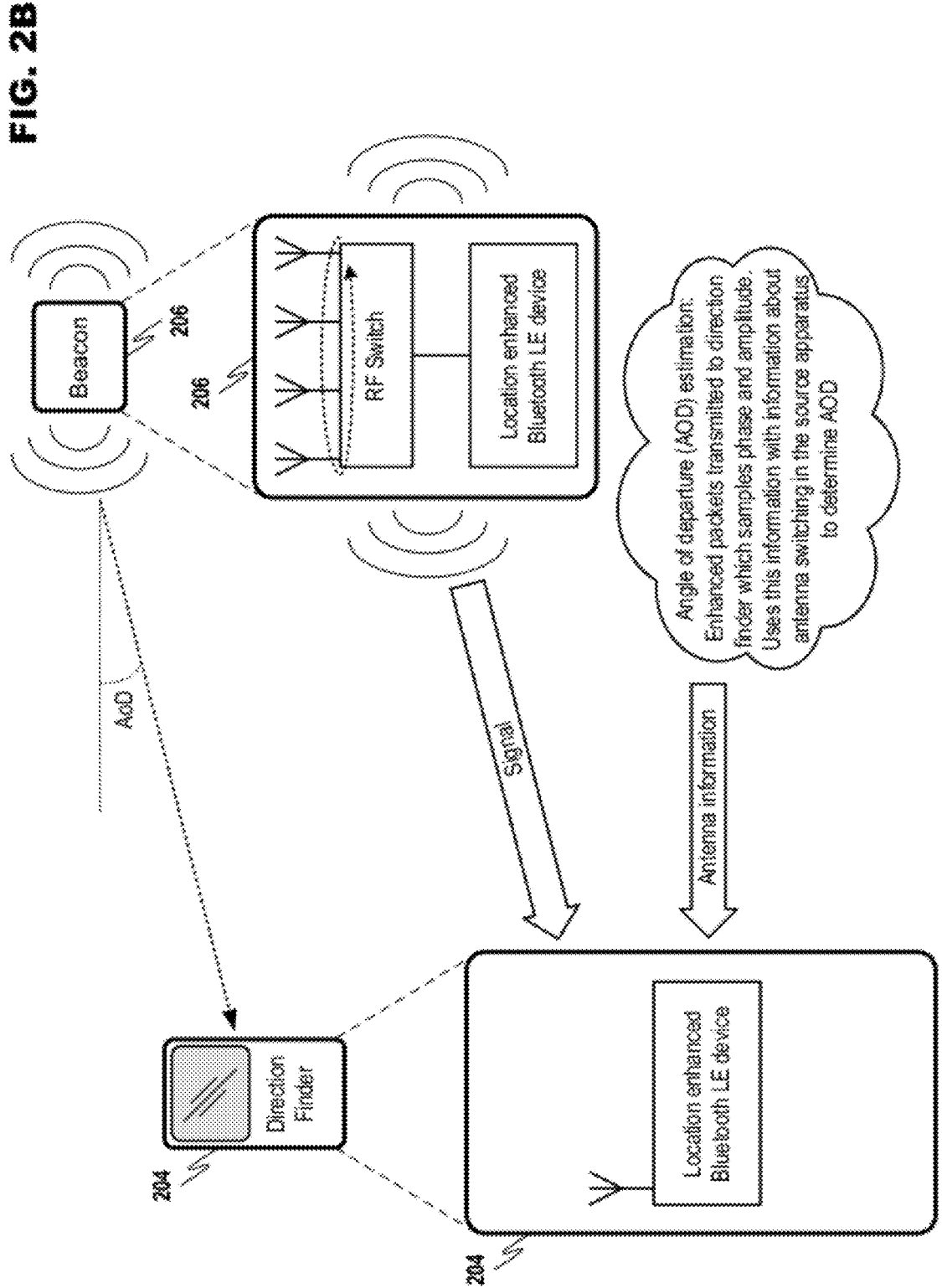
FIG. 2B discloses an example of angle-of-departure (AoD) positioning in accordance with at least one embodiments of the present invention.

FIGS. 2A and 2B disclose two examples of electronic direction-finding that may be implemented in an apparatus. For the sake of explanation in these figures it is assumed that at least one of the apparatuses 200 and 202 is "simple" (e.g., a key tag) in that the apparatus may possess limited space, processing and/or power resources, and thus, may communicate using a low power consumption/capacity wireless communication medium like Bluetooth Low Energy (Bluetooth LE). Bluetooth LE has been integrated into the Bluetooth Core 4.0 specification and provides a lightweight Link Layer capable of providing ultra-low power idle mode operation, simple device discovery, and reliable point-to-multipoint data transfer with advanced power-save and secure encrypted connections at the lowest possible cost. While various embodiments of the present invention will be described using Bluetooth LE, the use of this communication medium is not intended to limit the present invention. On the contrary, it is conceivable that the various embodiments of the present invention may be implemented using alternative wireless mediums.

FIG. 2A discloses an example scenario wherein apparatus 200 may estimate the angle of arrival (AoA) of a communication signal received from apparatus 202. In the course of this estimation, various amplitude and phase samples for the signal may be measured at each antenna in an antenna array residing in apparatus 200. Amplitude and phase measurements may be recorded by cycling an RF switch through each antenna in the array. Receiving apparatus 200 may then estimate an AoA for the signal using the recorded samples and parameters related to the antenna array. The antenna array parameters may pertain the antenna array type and antenna pattern, and may be set in the device, for example, as part of the apparatus manufacturing process. As further set forth in FIG. 2A, apparatus 200 must be able to identify that a signal is usable for performing AoA estimation prior to initiating the process. The usability of a signal may depend on apparatus 200 knowing what signal content to measure, including at least the length of the signal content to measure and possibility even a bit pattern contained in the signal content. The ability to communicate this signal information, given the capacity limitations of Bluetooth LE as it currently exists, may be somewhat limited.

FIG. 2B discloses an example of apparatus 204 performing angle-of-departure (AoD) estimation for a signal transmitted from apparatus 206. In such a configuration apparatus 206 may transmit AoD enhanced packets and may execute antenna switching during the transmission of the packet.

Apparatus 204 may scan for the AoD enhanced packets and may execute amplitude and phase sampling during reception of these packets. Apparatus 204 may then utilize the amplitude and phase samples, along with antenna array parameter information, to estimate the AoD of the packet from apparatus 206. In accordance with at least one embodiment of the present invention, some of the fixed parameters related to the physical configuration of the antenna array in apparatus 206 may be obtained from a remote resource, such via a wired or wireless link to the Internet. Again, while the positioning solution provided in FIG. 2B allows for positioning estimation in an apparatus that may not contain its own dedicated position hardware and/or software, apparatus 204 must be aware that the packets in the signal transmitted by apparatus 206 are AoD enhanced packets prior to initiating the AoD estimation. Bluetooth LE, in its current form, does not provide an efficient vehicle for conveying this information to apparatus 204.

In order to communicate that information usable for direction finding is being transmitted, the data packets that are being used for direction finding must contain information that can be configured to indicate this purpose. However, if fields within the existing Bluetooth LE packet structure (e.g., the service field of Bluetooth LE advertising packet) are used for direction finding, the packet may be interpreted as erroneous by the cyclic redundancy check (CRC) at the receiver. This may be due in part to delay introduced by the antenna switching process that can confuse normal packet reception. Moreover "data whitening" (e.g., scrambling both the header and the payload of packet before transmission with a data whitening word in order to randomize, and thus distinguish, the data from highly redundant patterns and to minimize DC bias in the packet) that is employed in Bluetooth LE may further hinder the use of predetermined bit sequences for positioning since the bit sequences would be scrambled by the whitening algorithm and rendered unrecognizable. One possible solution to avoid CRC failure problems would be to not perform CRC checking when using a packet for positioning, as data decoding and error correction are not required for a signal being used for direction finding. This approach, however, may lead to other problems related to general data reception and correction. For example, as the address of the transmitting apparatus would not be checked with CRC, the possibility exists that the reliability of the data cannot be correctly established by the receiver.

III. Example Data Packets Modified to Include Positioning Information

Readily available signals, and in more detail the featured packet structures, from standardized radios do not necessarily have long enough known signal sequences with beneficial properties to enable direction finding. Additionally, existing packet types that may be usable for positioning may not necessarily be exchanged in the right phase of the communication sequence. Proprietary solutions have limited applicability since wide industry support and interoperability would not be achieved. A standardized solution for providing positioning information would be more readily appreciated, and thus adopted, by users. In view of existing and foreseeable use cases served by Bluetooth technology, it would serve well as a direction finding signal carrier.

In particular, Bluetooth Low Energy (Bluetooth LE) radio technology is expected to become a common communication technology in mobile devices and various battery-operated devices like key tags. At the same time, there are many radio signal-based positioning use cases (e.g., direction finding) that would apply very well for mobile phone users and very low power devices. However, there is no support for positioning in current Bluetooth LE technology. The various embodiments of the present invention, as disclosed herein, are at least in part directed to providing positioning support on top of unicast connection between two Bluetooth LE devices. However, while Bluetooth LE technology provides a good basis from which to explain example embodiments of the present invention, the present invention is not limited to implementation with only Bluetooth LE technology, and may be implemented with other wireless technologies.

For example, two apparatuses may initiate wireless interaction, and through this interaction may determine whether positioning services are supported. If one or both devices support positioning services, various messages may be exchanged to, for example, configure the positioning information, to request transmission of the positioning information and to transmit the positioning information. After receiving messages comprising the positioning information, one or both apparatuses may utilize the received positioning information to determine apparatus position, for example, comprising a relative direction from the "tracker" apparatus towards the opposing or "target" apparatus. While labels such as "tracker" or "seeker" and "target" may be given to various apparatuses in the following disclosure, the following examples illustrate that, in some instances, apparatuses may serve dual roles. Moreover, the following examples may also refer to positioning and/or direction finding (DF) interchangeably. The term "positioning" is considered to encompass a broader classification including direction finding, location determination, mapping, routing, etc. Therefore, the term positioning, for the sake of example herein, also includes direction-finding.

In accordance with at least one embodiment of the present invention, direction finding may be implemented over a receiver using packets comprising a known bit sequence. Standard packet structures may be defined for configuring the bit sequence (e.g., in situations where the bit sequence is configurable), for initiating bit sequence transmission and for carrying the bit sequences. Positioning service information may be exchanged between two apparatuses, such as between a master and slave apparatus during a service discovery protocol in an example Bluetooth LE implementation. Positioning service information may comprise supported positioning functionality including, but not limited to, the positioning roles supported by each apparatus (target and/or seeker), bit sequence types supported by each apparatus such as Angle of Arrival (AoA) sequences, Angle of Departure (AoD) sequences and combined AoA and AoD sequences, whether the bit sequences are configurable, and if so, bit sequence lengths that are supported by each apparatus, bit sequence transmission rates, etc.

In response to learning the capabilities of the other apparatus, further messaging may take place wherein an apparatus in the seeker role (e.g., the apparatus receiving packets containing bit sequences) may attempt to configure packet transmission in the target apparatus. For example, if the target device determines that the bit sequence transmission is configurable, the seeker may transmit a positioning configuration message requesting a bit sequence type (e.g., AoA, AoD or combined AoA and AoD), a bit sequence length, a single bit sequence packet or a burst of multiple bit sequence packets, etc. A message may then be sent from the seeker to the target to initiate transmission of the positioning information messages (e.g., packets containing bit sequences configured based on the positioning configuration message) for use in positioning.

In example scenarios where embodiments of the invention may be implemented using Bluetooth LE technology, an apparatuses' capability for unicast positioning (e.g., direction finding or DF) functionality can be indicated by an assigned service ID. Apparatuses can utilize standard service discovery mechanisms to find out whether other apparatuses support unicast DF and whether unicast DF parameters can be configured. If the device wants to configure DF parameters it can perform that with positioning (e.g., DF) configuration messaging. For example the device may want to configure the length of the bit sequence (e.g., "DF tail bits" since, in accordance with at least one embodiment of the present invention the bit sequence may be added to end of a message packet). Service discovery and positioning configuration messaging may happen right after entering a formal connection state or on any other time triggered by the master or the slave device. The capability to participate in positioning (e.g., direction finding) may also be also learned through standard LL_FEATURE_REQ and LL_FEATURE_RSP messages that include FeatureSet fields. In Bluetooth LE these fields currently only have bit positions assigned to indicate whether LE encryption is supported. In accordance with at least one embodiment of the present invention, unassigned bit positions in the FeatureSet fields may be used to indicate that an apparatus is capable of receiving control messages such as defined in FIG. 7.

Now referring to FIG. 3, messaging that may be used in configuring and initiating transmission of positioning information may comprise the exchange LL_DF_REQ packets, as shown at 300, for requesting positioning information and LL_DF_RSP packets, as shown at 308, for responding to the requests (e.g., for providing positioning information). LL_DF_REQ packet 300 and LL_DF_RSP packet 308 may be implemented as link layer control payload data units (LL Control PDUs). In the current Bluetooth LE specification the operational codes (opcodes) between 0x0E-0xFF are reserved for future use (RFU), and two of these RFU opcodes may be assigned to LL_DF_REQ PDU 302 and LL_DF_RSP PDU 310. The format for LL_DF_REQ PDU 302 may comprise a header and payload as shown at 302, and which are broken out in detail at 304 and 306, respectively. Likewise LL_DF_RSP PDU 310 may comprise a header and payload as shown at 310, and which are broken out in detail at 312 and 314, respectively. It is important to note that LL_DF_RSP packet 308 includes "tail bits" comprising bit sequences that are usable by the receiving device for performing positioning operations (e.g., direction finding).

In at least one example implementation, two RFU bits in PDU header 312 may be reassigned to serve as an AoA/AoD indicator. The AoA/AoD indicator being set to "00" may indicate to the receiving apparatus that no tail bits have been appended to the packet, "01" may indicate that AoA tail bits have been appended to the packet, "10" may indicate that AoD tail bits have been appended to the packet, and "11" may indicate that combined AoA and AoD tail bits have been appended to the packet.

FIG. 4A discloses an example of the content of packet 308 when configured for use in AoD direction finding. Initially, the AoA/AoD indicator in packet 308 may be set to "10" to indicate to a receiving apparatus that AoD information has been appended to packet 308. The positioning information added to packet 308 (e.g., after the CRC) may then comprise AoD positioning information as defined in the AoD length field. The bit sequence shown at 400 may comprise a waveform including, for example, pseudorandom, continuous wave, repeated patterns, etc., wherein the number of bits is shown from "1" to "k" in FIG. 4. An example of antenna switching that may occur at the transmitter (Tx) during transmission of the packet is then shown under the bit numbers, which is then followed by an example of phase and amplitude sampling that may occur at the receiver as the packet is received by the direction finder. Some or all of the information disclosed in FIG. 4A may be utilized by the receiving apparatus to estimate the angle of departure the packet took from the transmitter.

In another example, FIG. 4B discloses a scenario where packet 308 is configured for AoA direction finding. In this instance the AoA/AoD indicator is set to "01" to indicate to a receiving apparatus that the packet contains AoA positioning information. The positioning information appended to the packet may be configured as set forth at 402, wherein the length of the AoA field is defined in the AoA length field with the header of the packet PDU. Similar to the example of FIG. 4A, a waveform including, for example, pseudorandom, continuous wave, repeated patterns, etc. of bits may be transmitted in the packet, and may be transmitted and sensed as shown. At least one difference may be noted in the example of FIG. 4B as compared to FIG. 4A wherein the antenna switching occurs at the receiving device (Rx) instead of the transmitting apparatus since the antenna array is located in the receiver. The phase and amplitude sampling for each bit 1 to N may also occur at the receiver as shown in FIG. 4B.

Figure 4C:
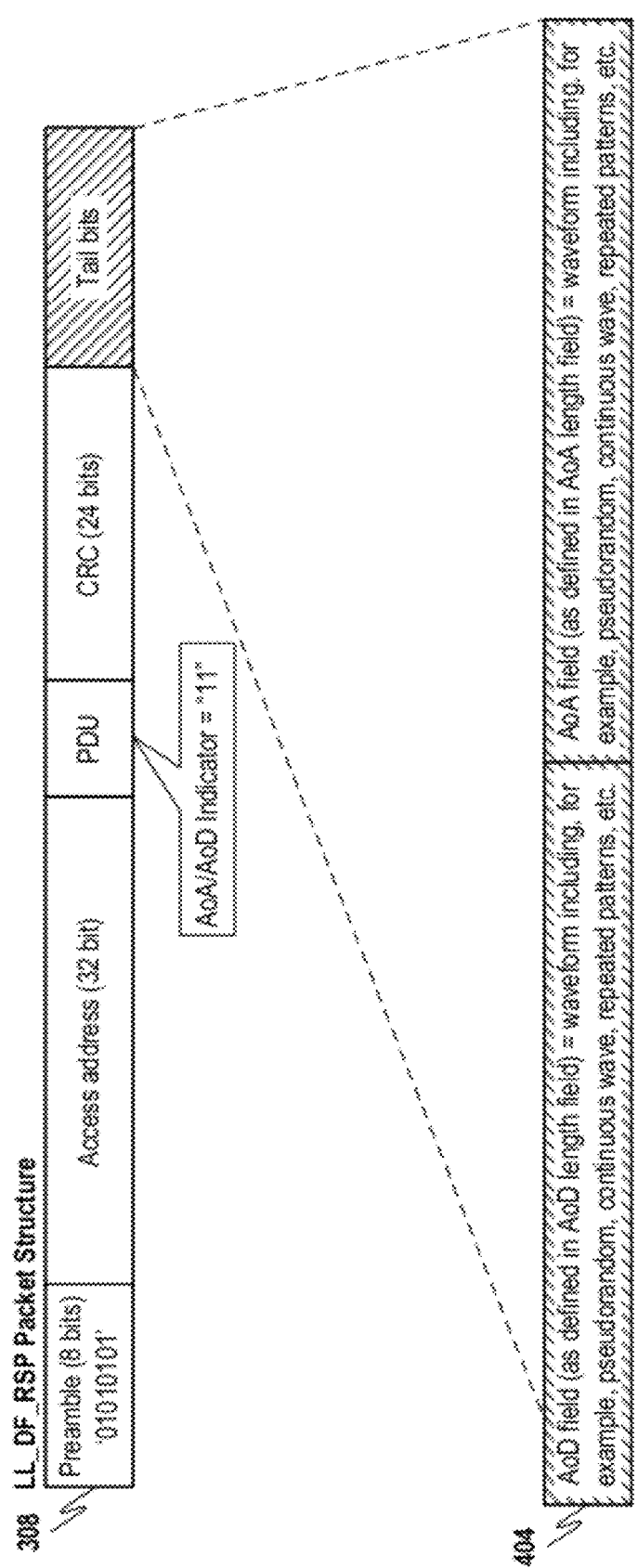
FIG. 4C discloses an example of combined positioning information in accordance with at least one embodiment of the present invention.

FIG. 4C discloses another example of packet 308 when it is configured to include positioning information for use in both AoA and AoD direction finding. In this example the AoA/AoD indicator may be configured to "11" to indicate to receiving devices that the packet contains both AoA and AoD information. Example positioning information is then disclosed at 404 including both AoA and AoD information in the packet after the CRC. In this instance the packet may also contain length information that sets forth the length of both the AoA and AoD information individually so that receiving devices may know when the AoA bit sequence ends and the AoD bit sequence begins.

IV. Example Usage Scenarios

Figure 5:
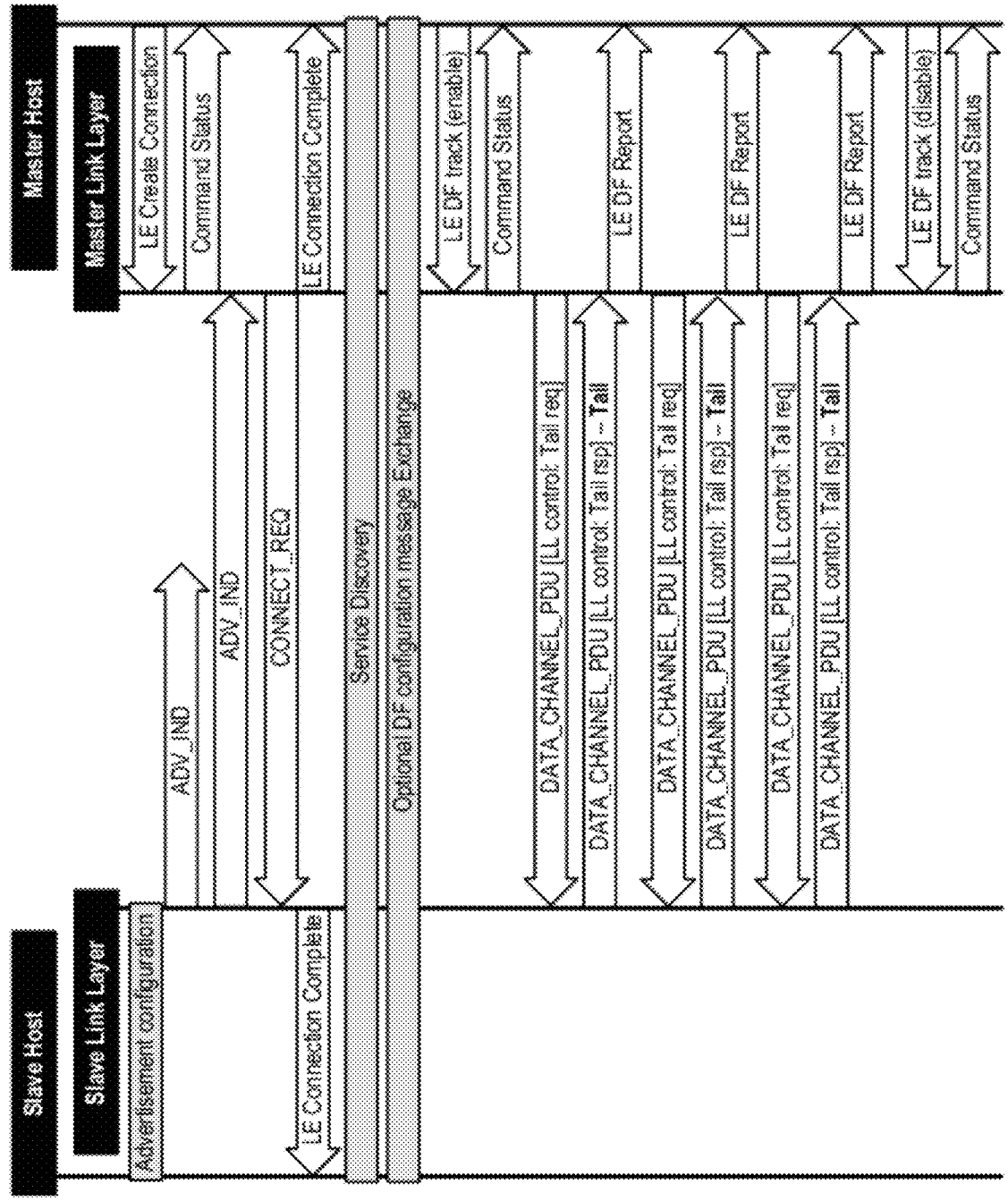
FIG. 5 discloses an example wireless interaction scenario between apparatuses in accordance with at least one embodiment of the present invention.

FIG. 5 discloses an interaction scenario using Bluetooth LE technology wherein messages are exchanged between a slave and master apparatus. The slave device may comprise a slave host (e.g., comprising upper-level functionality) and a slave link layer (e.g., comprising lower-level communication operations). Similarly, the master apparatus may comprise a master host and a master link layer. As a part of ordinary communications advertisement configuration may occur in apparatuses seeking to establish communication with other apparatuses (e.g., in the slave apparatus) and may be followed by transmission of advertising messages (e.g., ADV_IND) inviting other apparatuses to interact with the slave device. The master may also determine that communication is desired (e.g., triggered by an application desiring position information) and a LE Create Connection instruction may be sent from the host layer to the master link layer. Upon receiving the ADV_IND message, the master link layer may response with a CONNECT_REQ message and a link may be established between the apparatuses, which is confirmed in each device by a LE Connection Complete message being sent from the link layer to the host layer.

Positioning (e.g., DF) messaging may be initiated after a formal connection is established in order to improve privacy. Service discovery may occur utilizing service discovery protocols associated with the particular communication medium being employed (e.g., Bluetooth LE). Service discovery may allow both apparatuses to determine whether positioning services are supported in the apparatuses, and if supported, the extent to which the positioning services may be configured. In instances where positioning services are available but not configurable, the tracker may request positioning information to be sent with the expectation that messages containing predetermined positioning information will be transmitted (e.g., including a fixed bit sequence). Alternatively, an optional DF configuration message exchange may occur between devices as shown in FIG. 5 to allow the tracker, in this instance the master apparatus, to request specific positioning information from the target, in this instance the slave apparatus. Specific positioning information that may be configurable may comprise requesting a certain type of bit sequence (e.g., AoA, AoD or combined AoA and AoD), a certain length of bit sequence, a certain number of bit sequences (e.g., a single message vs. a burse of messages), etc.

After any configuration occurs, tracking resources may be activated in the master apparatus through issuance of a LE DF track (enable) command sent from the host to the link layer. Tracking resources may encompass any hardware and/or software in the master apparatus that would be needed to receive and process messages comprising positioning information. The activation of the tracking resources may be confirmed by a command status message. As shown in the example of FIG. 5, the master link layer may then transmit a LL_DF_REQ packet (e.g., DATA_CHANNEL_PDU [LL control: Tail req]) to the slave link layer requesting transmission of positioning information, and may begin listening for the response from the slave link layer. The slave link layer may then respond with a LL_DF_RSP packet (DATA_CHANNEL_PDU [LL control: Tail Rsp—Tail], wherein "—Tail" represents a bit sequence being appended to the end of the response packet). Upon receipt, the master device link layer may report the results. For example, raw positioning information may be reported to the host layer, which processes the raw positioning information into apparatus position information (e.g., a AoA or AoD estimation indicating the relative direction towards the slave apparatus). Alternatively, some or all of the processing of the raw positioning information may occur in the link layer, and estimated results based on the received positioning information are then reported to the master host layer. Depending upon the original configuration (if configurable), the cycle of requesting and receiving positioning information may continue until, for example, a set number of cycles have occurred, the master host (e.g., the user or application that invoked positioning) no longer needs positioning information, etc. The process may end with an LE DF track (disable) command being sent from the master host to the master link layer, and the link layer confirming the command with a command status response.

Figure 6:
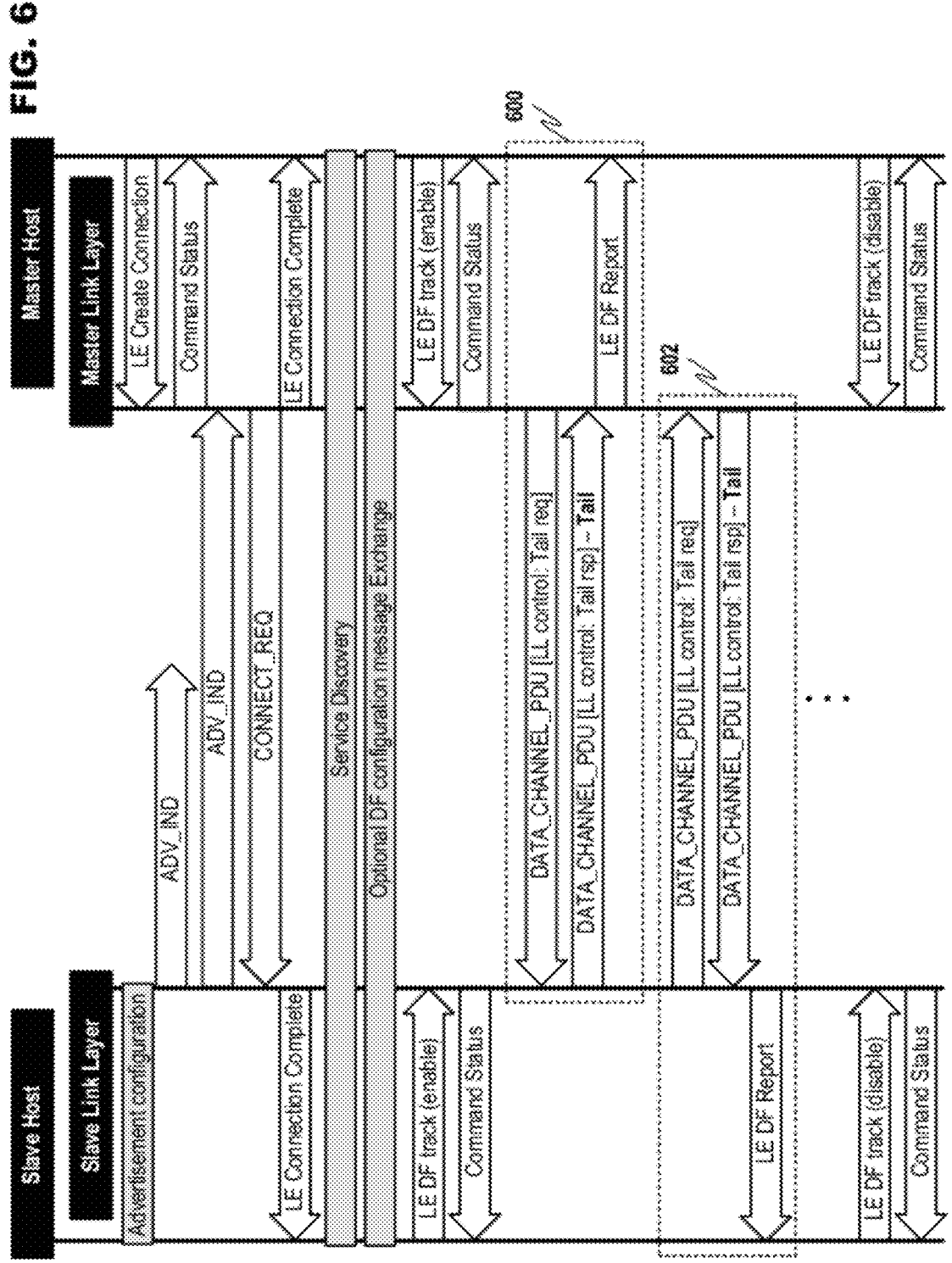
FIG. 6 discloses another example wireless interaction scenario between apparatuses in accordance with at least one embodiment of the present invention.

The example disclosed in FIG. 5 summarizes a basic interaction in which a master apparatus acts as a tracker and a slave apparatus acts as a target. It is also possible, based on this example, for the roles to be reversed wherein the master apparatus acts as a target and the slave apparatus acts as a tracker. FIG. 6 discloses an example where the master and slave apparatuses take on dual roles as both tracker and target. Similar activities may occur in FIG. 6 as compared to FIG. 5 at least with respect to connection establishment. Service discovery and optional DF configuration message exchange may also act similarly except that these activities may operate in both directions with the master and slave apparatuses each discovering the DF capabilities in the other apparatus, and if configurable, configuring positioning information (e.g., bit sequence type, content, message quantity, etc.) in the opposing apparatus. LE DF track enable commands may then be issued in both devices to initiate tracking services. As shown at 600 in FIG. 6, a request message from one apparatus (in this instance the master link layer) may trigger the slave link layer to transmit a response message including positioning information. The master link layer may receive this information and report results to the master host. This process may then reverse as indicated at 602, wherein the slave link layer may request transmission of positioning information from the master apparatus via a DATA_CHANNEL_PDU [LL control: Tail req] message. The master link layer may respond with a message containing positioning information. After receiving the positioning information, the slave link layer may report results to the slave host. These message exchanges may occur once each, or may continue until, for example, a set number of exchanges have occurred, the master host (e.g., the user or application that invoked positioning) no longer needs positioning information, etc. The participating apparatuses may then each issue LE DF track (disable) commands from their respective hosts to deactivate positioning in each apparatus that may be confirmed by a command status message sent from each link layer.

Figure 7:
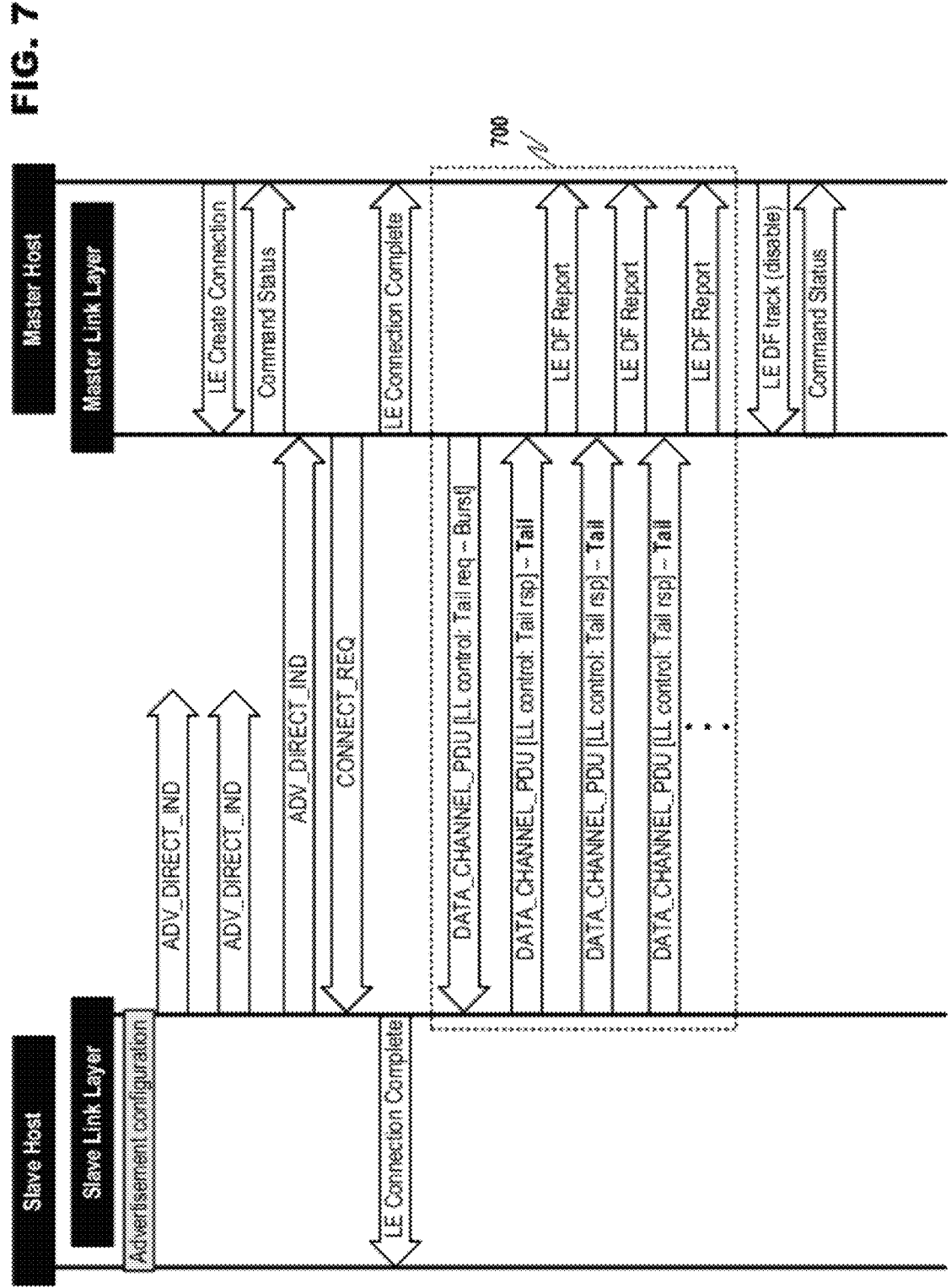
FIG. 7 discloses a third example wireless interaction scenario between apparatuses in accordance with at least one embodiment of the present invention.

FIG. 7 discloses an example wherein an apparatus requests a burst of messages containing positioning information from another apparatus. A burst of messages may comprise any amount of messages greater than one. For example, in FIG. 7 the master apparatus, acting as a tracker, is requesting a burst of three messages from the target slave apparatus. Advertising and connection establishment may occur as in the previous examples. No service discovery or DF message configuration messages are disclosed in FIG. 7. Further, no activation of tracking services is disclosed for the master apparatus. The omission of such operations may be because the devices were previously interacting in a tracker/target relationship, and thus, any information regarding available services is already known for each of the apparatuses in this example, as well as any required tracking services may already be active in the master apparatus. However, this is not to say that such operations cannot occur in one or both of the devices if desired or required.

As identified at 700 in FIG. 7, the master link layer may transmit a message requesting burst of messages comprising positioning information to the slave link layer (e.g., DATA_CHANNEL_PDU [LL control: Tail req—Burst]). The slave link layer may then respond by sending the requested messages as shown at 700. The number of messages transmitted may be fixed (e.g., the same number of messages are sent in response to any burst request) or may be configurable by the slave through a DF configuration message. After each positioning information message is received by the master link layer, an LE DF report may be sent to the master host. Positioning may terminate when positioning resources are deactivated by the LE DF Track (disable) command is issued by the master host and is confirmed by the link layer.

It is also possible to combine the embodiments of the present invention, such as providing positioning information in advertising packets and post-link specialized packets, in order to boost system performance. The Bluetooth 4.0 specification allows slave devices to use ADV_DIRECT_IND messages to help the master to reconnect the slave after losing connection. In accordance with at least one embodiment of the present invention, the target device may add DF tail information to the advertising (e.g., ADV_DIRECT_IND) packets sent to reestablish the connection. This will speed up the master to get the correct direction. The benefit realized in improved positioning performance may be significant in instances where the slave device is not able to receive CONNECT_REQ packet(s) properly from the master apparatus, but the master apparatus is still able to receive one or more ADV_DIRECT_IND packets from the slave device.

Figure 8:
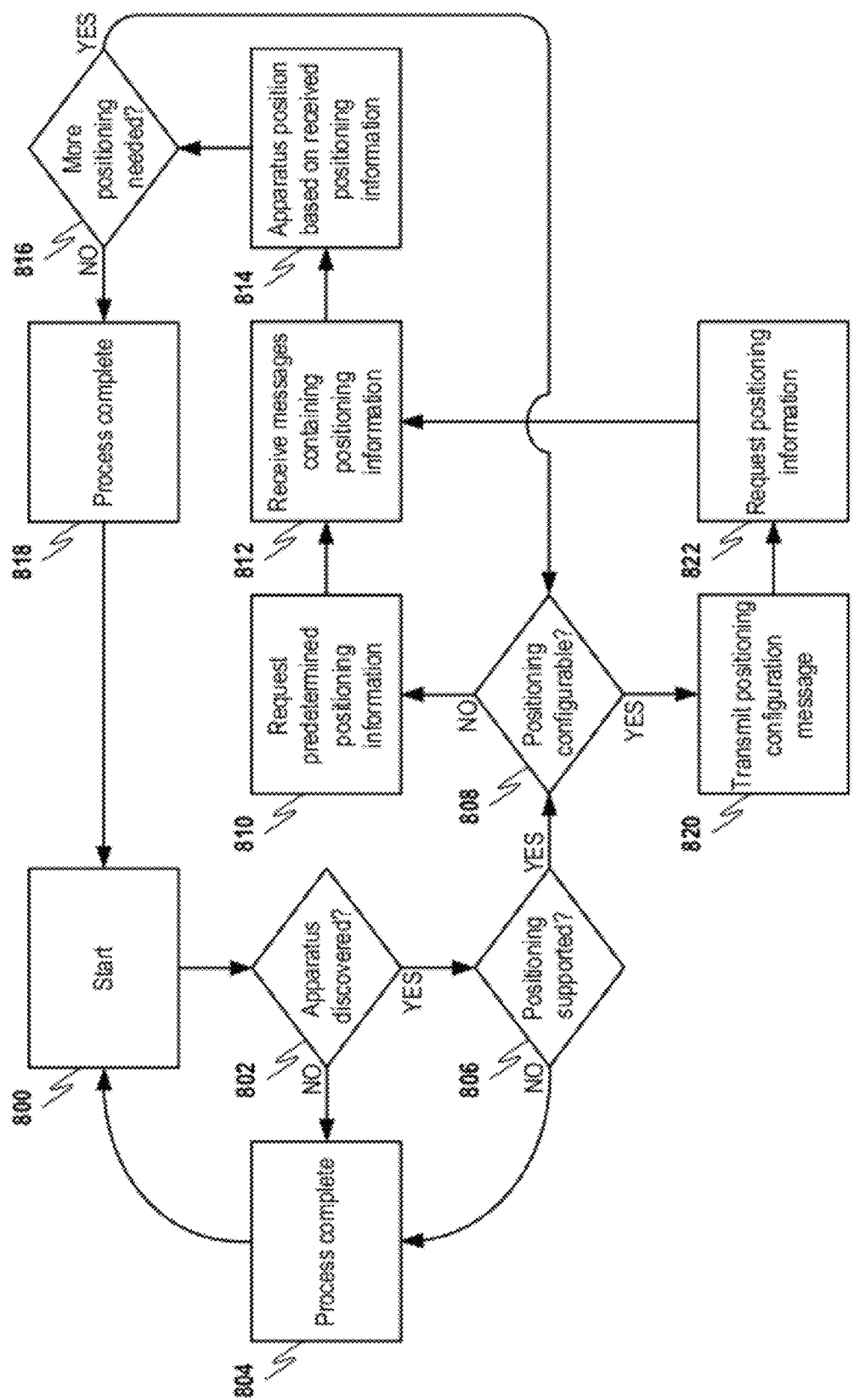
FIG. 8 discloses a flowchart of an example communication process from the perspective of an apparatus acting in tracker role in accordance with at least one embodiment of the present invention.

A flowchart of an example communication process from the perspective of an example apparatus acting in the role of tracker, in accordance with at least one embodiment of the present invention, is now disclosed with respect to FIG. 8. The process may initiate in step 800 followed by a discovery process in step 802 wherein, for example, an apparatus may advertise its presence to other apparatuses in order to prompt connection establishment. If no other apparatuses are encountered in step 802, then the process may terminate in step 804 and may reinitiate in step 800 (e.g., in preparation for the next positioning requirement triggered by resources in the apparatus host layer). Alternatively, if at least one other apparatus is discovered with which a formal connection may be established, the process may move to step 806 wherein a further determination is made as to whether the other apparatus supports positioning services. The determination of step 806 may be based on, for example, a service discovery protocol associated with the particular wireless communication medium that is being employed. If in step 806 it is determined that positioning is not supported in the other apparatus, then the process may again be complete in step 804. Otherwise, the process may proceed to step 808.

In step 808 a further determination may be made as to whether the positioning services are configurable in the other apparatus. If a determination is made that the positioning services are not configurable, then in step 810 a message requesting transmission of messages comprising predetermined positioning formation may be sent from the apparatus to the other apparatus. The apparatus may then receive message containing positioning information from the other apparatus in step 812, and in step 814 may determine apparatus position based on the received positioning information. For example, determining apparatus position may comprise estimating a relative direction from the apparatus towards the other apparatus based on the received positioning information. A further determination may then be made in step 816 as to whether more positioning information is needed (e.g., the user/host level application requesting that invoked the positioning operation requires additional positioning data). If more positioning information is determined to be needed in step 816, then the process may return to step 808 to request the transmission of predetermined or configured positioning information. Otherwise, the process may then be complete in step 818 and may reinitiate in step 800. If in step 808 a determination is made that positioning is configurable in the other apparatus, then in step 820 positioning configuration messages may be exchanged between the apparatuses. For example, the apparatus may request that positioning information (e.g., a bit sequence) be of a particular type (AoA, AoD or combined AoA and AoD), be of a particular length, be transmitted in a particular number of messages, be transmitted in a burst of messages, etc. The process may then proceed to step 822 wherein the apparatus requests that the other apparatus transmit messages comprising positioning information in accordance with the configuration that occurred in step 820. The process may then return to step 812 wherein messages comprising positioning information are received by the apparatus, which may be followed by apparatus position being determined based on the received positioning information in step 814. The process may then either return to step 808, if a determination is made in step 816 that more positioning information is needed, or alternatively, may be complete in step 818 and may reinitiate in step 800.

Figure 9:
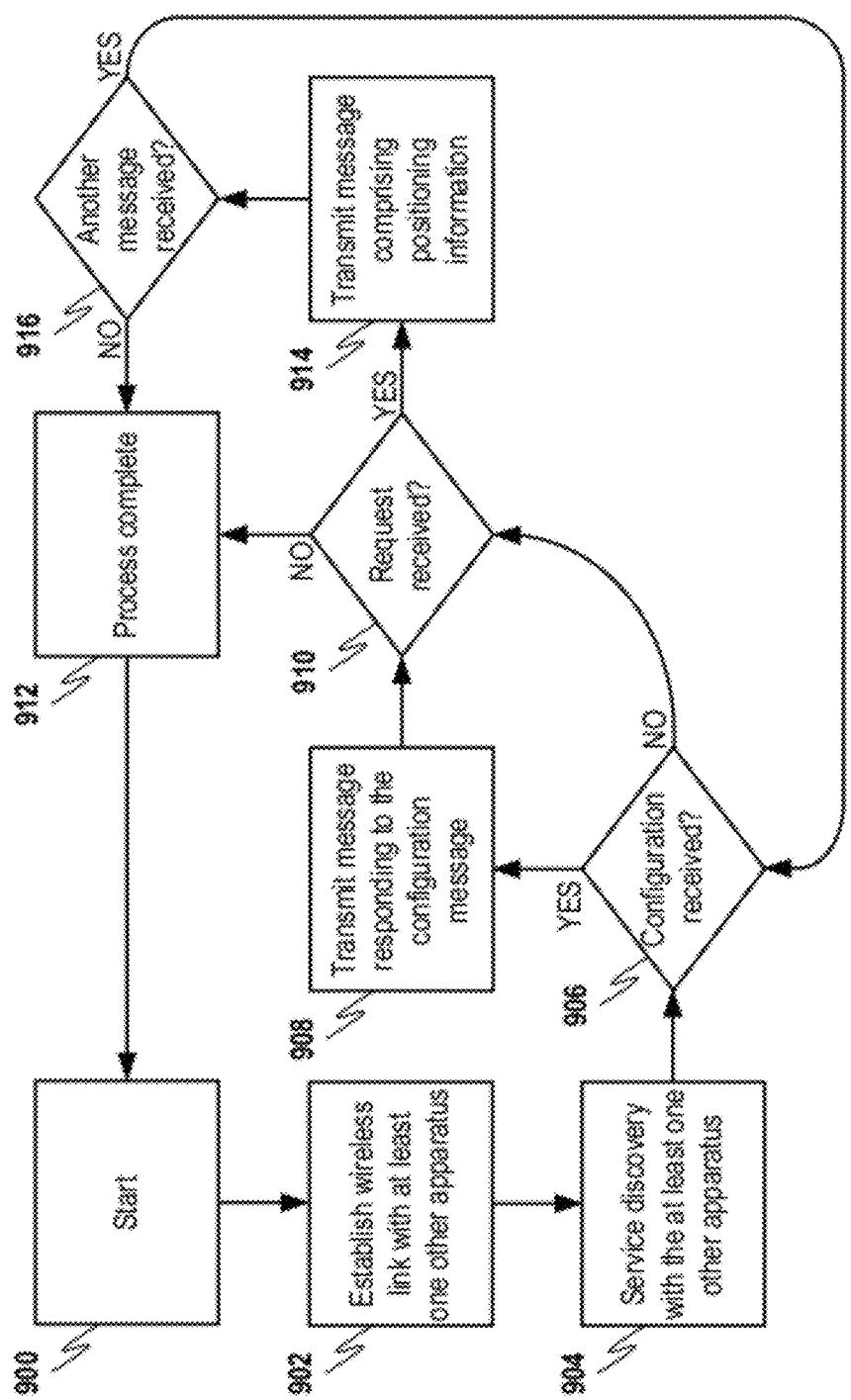
FIG. 9 discloses a flowchart of an example communication process from the perspective of an apparatus acting in a target role in accordance with at least one embodiment of the present invention.

A flowchart of an example communication process from the perspective of an example apparatus acting in the role of target, in accordance with at least one embodiment of the present invention, is now disclosed with respect to FIG. 9. The process may initiate in step 900 and in step 902 a link may be established between an apparatus (e.g., acting in the target role) and at least one other apparatus (acting in the tracking role). The link may be established in accordance with a formal link establishment process in a wireless communication medium like Bluetooth LE wherein, for example, an apparatus advertises its presence to another apparatus that responds with information needed to create a wireless a connection between the apparatuses. The process may then proceed to step 904 wherein service discovery may occur between the apparatuses. For example, a Bluetooth LE service discovery process allows each apparatus to learn about the services available from each of the apparatuses, including positioning services.

More specifically, during the discovery process the other apparatus, acting in the tracker role, may learn about positioning services in the apparatus and whether these services are configurable. In step 906 a determination may be made as to whether a configuration message is received in the apparatus from the other apparatus. For example, the other apparatus may learn that positioning services are configurable in the apparatus during the discovery process, and may then attempt to configure these services in the apparatus. If a configuration message is received, then the process proceed to step 908 wherein the apparatus, acting in the target role, may respond to the received configuration message by transmitting a message that, for example, responds by confirming the positioning information configuration that will be used for message transmission.

Regardless of whether a configuration interaction occurs in step 908 or whether no configuration occurs as a result of a "no" determination in step 906, the process may proceed to step 910 wherein a further determination may be made as to whether a message requesting transmission of positioning information was received in the apparatus. If it is determined that no request for positioning information was received, then the process may be complete in step 912 and may return to step 900 in preparation for the next link establishment to occur. Otherwise, the process may process to step 914 where the apparatus, acting in the target role, transmits at least one message comprising positioning information. The manner in which the at least one message is transmitted in step 912 may depend upon whether a predetermined (e.g., fixed) configuration or a configuration resulting from step 908 is being employed by the apparatus. A further determination may then be made in step 916 as to whether another message (e.g., either a configuration request message or a message requesting positioning information) was received in the apparatus. If it is determined in step 916 that another message was received, the process may return to step 906 to resume configuration and/or request message processing. Otherwise, the process may then be complete in step 912 and may reinitiate in step 900 as described above.

The various embodiments of the present invention are not limited only to the examples disclosed above, and may encompass other configurations or implementations.

At least one example embodiment of the present invention may also include an apparatus comprising means for activating positioning resources, means for discovering via wireless communication another apparatus enabled to transmit positioning information, means for transmitting one or more messages to the other apparatus via wireless communication, the one or more transmitted messages comprising a request for positioning information, means for receiving one or more messages from the other apparatus via wireless communication, the one or more received messages comprising positioning information, and means for determining apparatus position based on the received positioning information using the positioning resources.

At least one example embodiment of the present invention may also include an apparatus comprising means for engaging in a formal wireless connection with at least one other apparatus, means for transmitting information about positioning services available from the apparatus to the at least one other apparatus, means for, if a positioning configuration message is received from the at least one other apparatus, transmitting a message responding to the positioning configuration message, and means for, if a positioning information request message is received from the at least one other apparatus, transmitting at least one message comprising positioning information.

At least one example embodiment of the present invention may also include electronic signals that cause an apparatus to activate positioning resources, discover via wireless communication another apparatus enabled to transmit positioning information, transmit one or more messages to the other apparatus via wireless communication, the one or more transmitted messages comprising a request for positioning information, receive one or more messages from the other apparatus via wireless communication, the one or more received messages comprising positioning information, and determine apparatus position based on the received positioning information using the positioning resources.

At least one example embodiment of the present invention may also include electronic signals that cause an apparatus to engage in a formal wireless connection with at least one other apparatus, transmit information about positioning services available from the apparatus to the at least one other apparatus, if a positioning configuration message is received from the at least one other apparatus, transmit a message responding to the positioning configuration message, and if a positioning information request message is received from the at least one other apparatus, transmit at least one message comprising positioning information.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    discovering, by an apparatus, via wireless communication another apparatus enabled to transmit positioning information, wherein the positioning information enables the apparatus to determine at least one of an angle of arrival to the apparatus and an angle of departure from the other apparatus;
    transmitting one or more messages from the apparatus to the other apparatus via wireless communication, the one or more transmitted messages comprising a request for the positioning information;
    receiving one or more messages into the apparatus from the other apparatus via wireless communication, the one or more received messages comprising the positioning information; and
    determining apparatus position based on the received positioning information using positioning resources,
    wherein the discovering via wireless communication comprises receiving information about whether the other apparatus supports a direction finding service and whether a bit sequence of the positioning information provided by the direction finding service is configurable by the apparatus.

2. The method of claim 1, wherein the discovering via wireless communication comprises receiving information about services offered by the other apparatus via BLUETOOTH Low Energy.

3. The method of claim 1, wherein the one or more transmitted messages further comprises a configuration message requesting that positioning information be sent from the other apparatus to the apparatus in a preferred configuration specified by the apparatus, the preferred configuration comprising at least one of a plurality of different configurations available to the other apparatus.

4. The method of claim 1, wherein the positioning information comprises the bit sequence appended to the end of the one or more received messages.

5. The method of claim 1, wherein transmitting one or more messages comprises transmitting at least one of a positioning information configuration message and a positioning information request message.

6. The method of claim 5, wherein the positioning information request message comprises a request for a burst of messages to be transmitted by the other apparatus.

7. A method, comprising:
    engaging, by an apparatus, in a formal wireless connection with at least one other apparatus;
    transmitting information about positioning services available from the apparatus to the at least one other apparatus, wherein the information about available positioning services comprises information about whether a bit sequence of positioning information provided by the positioning services is configurable by the at least one other apparatus;
    if a positioning configuration message is received from the at least one other apparatus, transmitting a message responding to the positioning configuration message; and
    if a positioning information request message is received from the at least one other apparatus, transmitting at least one message comprising the positioning information, wherein the positioning information enables the at least one other apparatus to determine at least one of an angle of arrival to the at least one other apparatus and an angle of departure from the apparatus.

8. The method of claim 7, wherein the positioning information comprises the bit sequence appended to the end of the at least one transmitted message.

9. A computer program product comprising computer executable program code recorded on a non-transitory computer readable storage medium, the computer executable program code comprising:
    code configured to cause an apparatus to discover via wireless communication another apparatus enabled to transmit positioning information, wherein the positioning information enables the apparatus to determine at least one of an angle of arrival to the apparatus and an angle of departure from the other apparatus;
    code configured to cause the apparatus to transmit one or more messages to the other apparatus via wireless communication, the one or more transmitted messages comprising a request for the positioning information;
    code configured to cause the apparatus to receive one or more messages from the other apparatus via wireless communication, the one or more received messages comprising the positioning information; and
    code configured to cause the apparatus to determine apparatus position based on the received positioning information using positioning resources, wherein the code configured to cause the apparatus to discover via the wireless communication comprises code configured to cause the apparatus to receive information about whether the other apparatus supports a direction finding service and whether a bit sequence of the positioning information provided by the direction finding service is configurable by the apparatus.

10. The computer program product of claim 9, wherein the code configured to cause the apparatus to discover via the wireless communication comprises code configured to cause the apparatus to receive information about services offered by the other apparatus via BLUETOOTH Low Energy.

11. The computer program product of claim 9, wherein the one or more transmitted messages further comprises a configuration message requesting that positioning information be sent from the other apparatus to the apparatus in a preferred configuration specified by the apparatus, the preferred configuration comprising at least one of a plurality of different configurations available to the other apparatus.

12. The computer program product of claim 9, wherein the positioning information comprises the bit sequence appended to the end of the one or more received messages.

13. The computer program product of claim 9, wherein the code configured to cause the apparatus to transmit one or more messages comprises code configured to cause the apparatus to transmit at least one of a positioning information configuration message and a positioning information request message.

14. The computer program product of claim 13, wherein the positioning information request message comprises a request for a burst of messages to be transmitted by the other apparatus.

15. A computer program product comprising computer executable program code recorded on a non-transitory computer readable storage medium, the computer executable program code comprising:
    code configured to cause an apparatus to engage in a formal wireless connection with at least one other apparatus;
    code configured to cause the apparatus to transmit information about positioning services available from the apparatus to the at least one other apparatus, wherein the information about available positioning services comprises information about whether a bit sequence of positioning information provided by the positioning services is configurable by the at least one other apparatus;
    code configured to cause the apparatus to, if a positioning configuration message is received from the at least one other apparatus, transmitting a message responding to the positioning configuration message; and
    code configured to cause the apparatus to, if a positioning information request message is received from the at least one other apparatus, transmitting at least one message comprising the positioning information, wherein the positioning information enables the at least one other apparatus to determine at least one of an angle of arrival to the at least one other apparatus and an angle of departure from the apparatus.

16. The computer program product of claim 15, wherein the positioning information comprises the bit sequence appended to the end of at least one transmitted message.

17. An apparatus, comprising:
    at least one processor; and
    at least one memory including executable instructions, the at least one memory and the executable instructions being configured to, in cooperation with the at least one processor, cause the apparatus to perform at least the following:
        discover via wireless communication another apparatus enabled to transmit positioning information, wherein the positioning information enables the apparatus to determine at least one of an angle of arrival to the apparatus and an angle of departure from the other apparatus;
        transmit one or more messages to the other apparatus via wireless communication, the one or more transmitted messages comprising a request for the positioning information;
        receive one or more messages from the other apparatus via wireless communication, the one or more received messages comprising the positioning information; and
        determine apparatus position based on the received positioning information using positioning resources,
        wherein the at least one memory and the executable instructions being configured to, in cooperation with the at least one processor, cause the apparatus to discover via the wireless communication comprises the at least one memory and the executable instructions being configured to, in cooperation with the at least one processor, cause the apparatus to receive information about whether the other apparatus supports a direction finding service and whether a bit sequence of the positioning information provided by the direction finding service is configurable by the apparatus.

18. The apparatus of claim 17, wherein the at least one memory and the executable instructions being configured to, in cooperation with the at least one processor, cause the apparatus to discover via the wireless communication comprises the at least one memory and the executable instructions being configured to, in cooperation with the at least one processor, cause the apparatus to receive information about services offered by the other apparatus via BLUETOOTH Low Energy.

19. The apparatus of claim 17, wherein the one or more transmitted messages further comprises a configuration message requesting that positioning information be sent from the other apparatus to the apparatus in a preferred configuration specified by the apparatus, the preferred configuration comprising at least one of a plurality of different configurations available to the other apparatus.

20. The apparatus of claim 17, wherein the positioning information comprises the bit sequence appended to the end of the one or more received messages.

21. The apparatus of claim 17, wherein the at least one memory and the executable instructions being configured to, in cooperation with the at least one processor, cause the apparatus to transmit one or more messages comprises the at least one memory and the executable instructions being configured to, in cooperation with the at least one processor, cause the apparatus to transmit at least one of a positioning information configuration message and a positioning information request message.

22. The apparatus of claim 21, wherein the positioning information request message comprises a request for a burst of messages to be transmitted by the other apparatus.

23. An apparatus, comprising:
    at least one processor; and
    at least one memory including executable instructions, the at least one memory and the executable instructions being configured to, in cooperation with the at least one processor, cause the apparatus to perform at least the following:
        engage in a formal wireless connection with at least one other apparatus;

transmit information about positioning services available from the apparatus to the at least one other apparatus, wherein the information about available positioning services comprises information about whether a bit sequence of positioning information provided by the positioning services is configurable by the at least one other apparatus;

if a positioning configuration message is received from the at least one other apparatus, transmit a message responding to the positioning configuration message; and if a positioning information request message is received from the at least one other apparatus, transmit at least one message comprising the positioning information, wherein the positioning information enables the at least one other apparatus to determine at least one of an angle of arrival to the at least one other apparatus and an angle of departure from the apparatus.

24. The apparatus of claim 23, wherein the positioning information comprises the bit sequence appended to the end of the at least one transmitted message.

25. A system, comprising:
a tracking apparatus; and
a target apparatus;
the tracking apparatus discovering via wireless communication that the target apparatus is enabled to transmit positioning information, wherein the positioning information enables the tracking apparatus to determine at least one of an angle of arrival to the tracking apparatus and an angle of departure from the target apparatus;
the tracking apparatus further transmitting one or more messages to the target apparatus via wireless communication, the one or more transmitted messages comprising a request for the positioning information, and receiving one or more messages from the target apparatus via wireless communication, the one or more received messages comprising the positioning information; and
the apparatus further determining apparatus position based on the received positioning information using positioning resources,
wherein the discovering via wireless communication comprises receiving information about whether the target apparatus supports a direction finding service and whether a bit sequence of the positioning information provided by the direction finding service is configurable by the tracking apparatus.

26. The method of claim 7, wherein the positioning configuration message comprises a request that positioning information be transmitted from the apparatus to the at least one other apparatus in a preferred configuration specified by the at least one other apparatus, the preferred configuration comprising at least one of a plurality of different configurations available to the apparatus.

27. The computer program product of claim 15, wherein the positioning configuration message comprises a request that positioning information be transmitted from the apparatus to the at least one other apparatus in a preferred configuration specified by the at least one other apparatus, the preferred configuration comprising at least one of a plurality of different configurations available to the apparatus.

28. The apparatus of claim 23, wherein the positioning configuration message comprises a request that positioning information be transmitted from the apparatus to the at least one other apparatus in a preferred configuration specified by the at least one other apparatus, the preferred configuration comprising at least one of a plurality of different configurations available to the apparatus.

* * * * *